July 26, 1955     J. ANDERSON ET AL     2,714,121
PROCESS FOR PRODUCTION OF HALOHYDRINS
Filed May 25, 1951
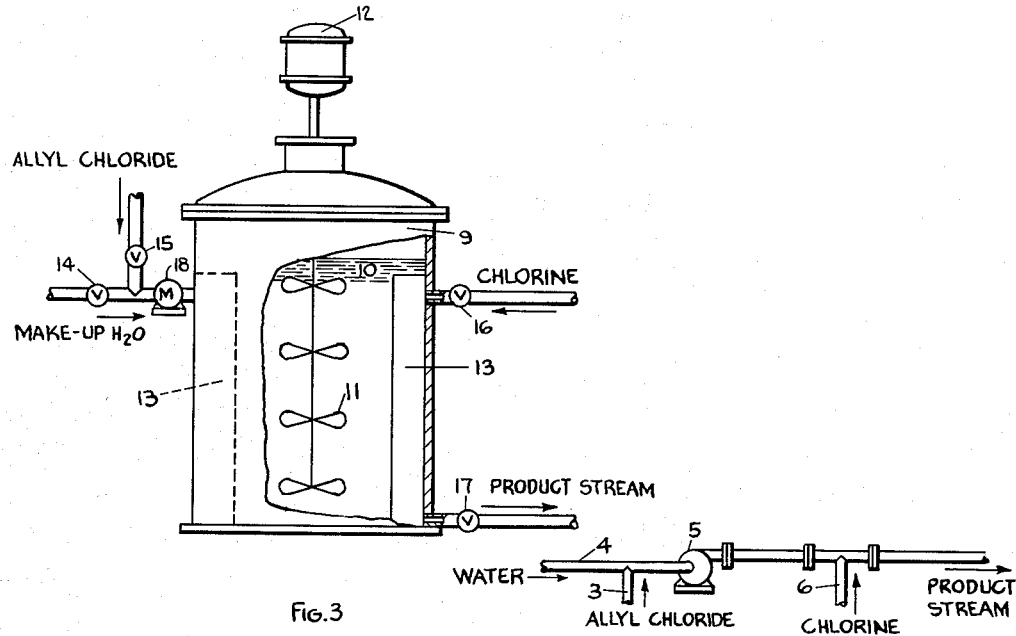
Fig. 3
Fig. 1
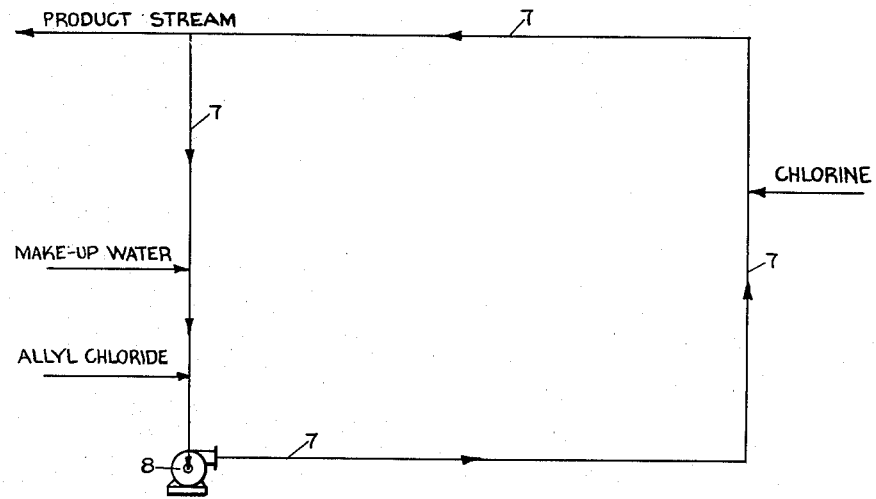
Fig. 2
Inventors: John Anderson
George F. Johnson
William C. Smith
By: *D. J. Hewitt*
Their Attorney

United States Patent Office 2,714,121
Patented July 26, 1955

2,714,121

PROCESS FOR PRODUCTION OF HALOHYDRINS

John Anderson and George F. Johnson, La Porte, and William C. Smith, Houston, Tex., assignors to Shell Development Company, Emeryville, Calif., a corporation of Delaware Application May 25, 1951, Serial No. 228,216

9 Claims. (Cl. 260—633)

This invention relates to the preparation of halogenated organic hydroxy compounds such as halohydrins wherein a hydroxy group and one or more halogen atoms are linked to different carbon atoms of an aliphatic radical. More specifically, the invention pertains to an improved process of treating unsaturated organic compounds, of the class described herein, with a hypohalous acid or with aqueous solutions containing this acid.

The prior art discloses that a great many unsaturated organic compounds, including various olefins, diolefins, acetylenes, alcohols, halides, ketones and aldehydes, have been reacted with HOCl to form the corresponding halohydrin compound. However, in effecting the halohydrination of these compounds, the yields of the desired halohydrin are seriously impaired as a result of the formation of various by-products, the same normally having a greater number of halogen atoms per molecule than the primary reaction product and frequently containing no hydroxy radical. These by-product losses have been particularly severe in the case of normally liquid olefinically unsaturated compounds which are substantially water-insoluble.

The foregoing difficulties are well illustrated in the case of allyl chloride. Here the over-all reactions involved in the halohydrination step (wherein allyl chloride and chlorine are added to an aqueous reaction mixture) are as follows:

(1) $H_2O + Cl_2 \rightarrow HOCl + HCl$ (in the absence of caustic)
or
(2) $NaOH + Cl_2 \rightarrow HOCl + NaCl$ (in the presence of caustic)

and (3)
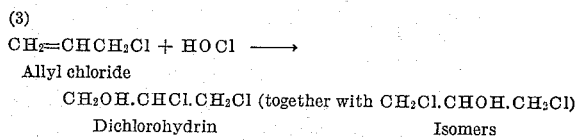

Unfortunately, Reaction 3 is accompanied by undesirable side reactions which normally consume at least 15% of the alyl chloride reactant, the principal side reactions being:

(4) 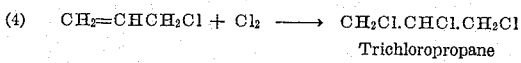

(5)
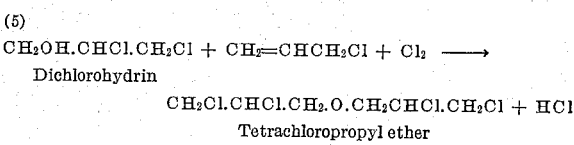

These side reactions take place in both the aqueous phase of the system as well as in the organic phase made up of the substantially water-insoluble trichloropropane and tetrachloropropyl ether by-products, together with any undissolved allyl chloride, the latter compound being soluble to the extent of but 0.36% in water at 20° C.

In order to reduce the side reactions occurring in the organic phase, it has heretofore been considered necessary to maintain that portion of the reaction mixture containing allyl chloride and chlorine as free as possible of any organic phase, and the practice has been to employ a recirculating system wherein the effluent from the reaction chamber is led into a settling tank from which the organic phase is drawn off as bottoms before the supernatent aqueous layer (from which a product stream is continuously withdrawn) is provided with additional quantities of the reactant compounds and make-up water and then recycled back to the reaction chamber. Further, the practice has been to add caustic to the reaction mixture so as to reduce the amount of free chlorine which is present in the solution, it having been observed that such chlorine tends to dissolve preferentially in the non-aqueous phase and thereby accentuates by-product formation. At best, however, it has not been possible to reduce organic phase by-product losses to less than about 5 or 6%, based on the amount of allyl chloride employed.

In addition to experiencing undesirably high by-product losses, the foregoing method of operation has other disadvantages as well. Of these, perhaps the most serious stems from the added costs incurred in building and maintaining the necessary settling chambers. It should also be mentioned that the process as heretofore practiced has required the use of relatively long residence times, usually in the order of from 1 to 2 hours, and it would be desirable if the same could be materially reduced while at the same time overcoming the other disadvantages of the process as outlined above.

A general object of the present invention is to avoid the above and other defects and to provide a process for the halohydrination of normally liquid and relatively water-insoluble olefinic compounds wherein the formation of undesirable by-products is maintained at a minimum. A further object is to provide an improved process for the halohydrination of unsaturated organic halides of the type of allyl chloride. A more particular object is to provide an improved process for reacting allyl chloride with hypochlorous acid (as produced by addition of chlorine to an aqueous reaction mixture, or otherwise) whereby the dichlorohydrin isomers 1,2-dichloro-3-hydroxypropane and 1,3-dichloro-2-hydroxypropane are obtained in increased yield, and with minimum production of trichloropropane and tetrachloropropyl ether. The nature of still other objects of the invention will become apparent from a consideration of the descriptive portion to follow.

It is our discovery that the organic phase by-product losses heretofore encountered in the halohydrination of normally liquid, substantially water-insoluble olefinic compounds can be substantially eliminated by maintaining any organic phase present in the reaction zone in a highly dispersed condition. This method of operation makes it possible to eliminate the organic phase separation steps heretofore practiced, and also obviates the necessity for adding caustic, though the latter may be employed, if desired, without harmful effects. From this it will be seen that the desired halohydrin products can be produced in much higher yields than was heretofore the case, while at the same time employing greatly simplified apparatus requiring but relatively short residence times.

The process of the present invention can be practiced with good effects while utilizing any one or more of a wide variety of compounds falling within the class of those which contain one or more olefinic double bonds in an aliphatic radical, and which are liquid at temperatures above about 20° C. and are substantially insoluble in water, i. e., soluble to the extent of less than about 1% at 20° C. Included within this class are, for example, allyl chloride, allyl bromide, methallyl chloride, the pentenes, hexenes and heptenes, isoprene, styrene, cinnamyl alcohol, coumarin, chloroprene, 2-chloro-1-propene, butylene bromide, butylene chloride, and the like.

As noted above, the reaction mixture present in the zone where reaction between the olefinic compound and the hypohalous acid occurs is so agitated or otherwise treated as to maintain in the finely divided condition any undissolved olefinic reactant or other non-aqueous phase component which may be present, and this condition should be preserved during the entire halohydrination reaction zone. The state of division required is that wherein the non-aqueous phase components present are maintained in the form of particles which are below 100 microns, and preferably below 50 microns, in diameter.

While our invention may be practiced with a wide variety of olefinic compounds, and with hypohalous acids produced by any one of the numerous methods disclosed in the art, the invention is best illustrated and described in terms of the process wherein allyl chloride and chlorine are added to an aqueous reaction mixture, with the resultant production of the desired dichlorohydrin isomers. Accordingly, the invention will hereinafter be described as it relates to this preferred embodiment thereof.

In forming dichlorohydrin (which term, as employed herein, includes both isomers) a variety of methods can be used. Thus, in continuous methods of operation, systems of the type illustrated, somewhat schematically, in Figures 1, 2, and 3 of the drawing can be employed. In the non-recirculating system illustrated in Figure 1, allyl chloride is continuously admitted through conduit 3 to a fresh water inlet stream passing through conduit 4, the allyl chloride being finely dispersed in the water stream as the latter passes through centrifugal pump 5, and maintained in the dispersed condition under the influence of the turbulence within conduit 5 as the stream passes the point at which chlorine is introduced through conduit 6. In using apparatus of this type, care should be taken to provide a residence time in conduit 4, following the point at which chlorine is introduced, sufficient to permit the reaction between the chlorine and the allyl chloride to become complete before the product stream is withdrawn from the system. As will be described more fully below, this reaction time can be as short as one or two seconds under good mixing conditions.

In the preferred method of continuous operation, the allyl chloride reactant is fed to, and rapidly dispersed in an aqueous reaction medium as the latter is continuously recycled through the apparatus. A system suitable for practicing the invention in this manner is shown schematically in Figure 2 of the drawing. Here an aqueous reaction stream in relatively large volume is continuously recycled through a central conduit system 7, while much smaller amounts of make-up water, allyl chloride and chlorine are continuously injected into the recycle stream and a correspondingly small product stream is withdrawn from the system. The make-up water and allyl chloride are fed to the recirculating stream as indicated in the drawing, whereupon the allyl chloride and the other organic phase components of the stream are finely dispersed as the stream passes through a centrifugal pump 8. It has been found that as a result of dispersing the organic phase in this manner, the allyl chloride is not extracted by the permanent organic phase components of the stream (largely trichloropropane and tetrachloropropyl ether), but instead dissolves rapidly in the aqueous phase, solution being substantially complete by the time the point of chlorine addition is reached. The product stream can be withdrawn from conduit 7 at any point after a sufficient time interval has been given (as by extension of that portion of conduit 7 in which reaction occurs, by slowing the rate of flow in that portion, or by the provision therein of an accumulation, or time tank) for the allyl chloride to react fully with the chlorine.

It will be obvious that when using a system of the type illustrated in Figure 2, any deficiency in the net amount of water present in conduit 7 as regards its ability to dissolve a given amount of allyl chloride may be overcome by increasing the rate at which the liquid is recycled through said conduit while maintaining the rate of allyl chloride addition at a constant level. The reaction mixture should be circulated through conduit 7 at the rate of at least 250 volumes per volume of allyl chloride added, and more preferably this rate is at least 400 volumes per volume of allyl chloride.

The process of the present invention can also be practiced batchwise. When this method of operation is adopted, the allyl chloride and chlorine reactants can be added to a body of water (which may, if desired, contain organic phase by-products) as the latter is continuously agitated to such an extent as to break into small droplets the added allyl chloride and any other organic phase components which may be present. Agitation is continued until reaction is complete, whereupon the dichlorohydrin can be recovered in good yield from the resulting reaction mixture.

In Figure 3 there is illustrated an apparatus which is adapted for either batch or continuous operation. This apparatus comprises a reactor vessel 9 wherein the aqueous reaction mixture 10 is agitated by means of propellers 11 driven by a motor 12. The interior walls of the reactor vessel are provided with inwardly extending radial vanes 13 which assist in breaking up any vortices which may form in the reaction mixture. When the apparatus is to be used in continuous operation, the vessel 9 is provided with water and the motor 12 started, whereupon valves 14, 15, 16 and 17 are opened permitting make-up water, allyl chloride and chlorine to flow continuously into the vessel and a product stream to be continuously withdrawn therefrom, the allyl chloride-make-up water stream preferably passing through a mixer 18 which breaks the allyl chloride up into the finely divided state before the same reaches the reaction chamber. When the apparatus of Figure 3 is employed in batch operation, the mixer 18 need not be employed unless water is added along with the allyl chloride, and valve 17 remains closed until all the allyl chloride and chlorine have been added to the agitated reaction mixture 10. When reaction is complete, valve 17 is opened and the mixture is removed from the vessel through the product withdrawal line.

Although the agitation and resultant dispersion of the organic phase described above have been primarily effected by means of a centrifugal pump or other motor driven impeller unit, it should also be noted that a wide variety of other dispersion or mixing devices can be used either in place of said unit or in conjunction therewith. Thus, the necessary degree of dispersion can be effected by use of orifice plates or by jets of one type or another.

In forming dichlorohydrin by any of the methods described above, the allyl chloride and chlorine are added to the aqueous reaction medium in substantially equimolar proportions, they being supplied in either the gaseous or the liquid condition. The proportion of water to total reactants may be varied within wide limits. Increasing the dilution has the effect of cutting down the amount of aqueous phase by-product formation, though the point is eventually reached where the added costs of handling the water in the product stream outweigh any further gains in yield experienced by further dilution of the solution. As a practical matter, a preferred range is from 10 to 50 volumes of water for each volume of allyl chloride. That is to say, in batch operations allyl chloride is added to the aqueous reaction mixture until one volume of allyl chloride has been added for each 10 to 50 volumes of water present. In continuous methods of operation, where make-up water and added reactant quantities are continuously added to the aqueous reaction mixture as a product stream is withdrawn, one volume of allyl chloride is added for each 10 to 50 volumes of make-up water.

The reaction between allyl chloride and chlorine can be conducted within a wide temperature range, and under atmospheric, subatmospheric or superatmospheric pressures. In general, reaction temperatures between about 10° C. and 90° C. can be employed. The reaction is somewhat exothermic in nature, and in most cases good results are obtained, particularly in continuous methods of operation, when the system is allowed to come to equilibrium at temperatures between 30° C. and 80° C.

In aqueous solution the reaction between allyl chloride and chlorine to produce dichlorohydrin is rapidly completed, and reaction intervals of but one or two seconds or less are sufficient in most cases. However, extension of the reaction period is without harmful result from the standpoint of product yield. In continuous methods of operation, total residence times (determined by dividing the total volume of the recirculating portion of the system by the rate of product draw-off per minute) of from 1 to 10 minutes are preferred, though good results have been obtained with even shorter residence times. As is the case with the reaction interval, the residence time may be extended beyond 10 minutes without deleterious effect from the product standpoint, though equipment and operating costs may be somewhat increased.

As noted above, the process of the present invention can be practiced without the addition of caustic. However, where corrosion becomes an important factor (the aqueous reaction mixture usually having a pH of about 0.3 to 1 when no caustic is added), it may be desirable to supply caustic in an amount sufficient to raise the pH to a value between about 2.5 and 6.

The dichlorohydrin can be recovered from the aqueous reaction mixture by distillation or by a practice of other separation methods as taught in the art. When the product is to be converted to glycerine, no such separation step is necessary for then the entire dichlorohydrin solution can be subjected to the hydrolysis step(s) by which the glycerine is formed.

The invention is illustrated in various of its embodiments by the following examples:

*Example I*

In this operation there was employed a circulating system of the type illustrated in Figure 2, the arrangement there shown being modified to the extent of having a mixer (comprising a centrifugal pump wherein the impeller was replaced by a rod) inserted in conduit 7 immediately downstream from the point of chlorine introduction. The system had an internal capacity of 247 volumes, and this amount of aqueous reaction mixture, at a temperature of 50° C. to 55° C., was circulated through the system by the centrifugal pump at a rate of about 1300 volumes per minute. Allyl chloride and make-up water were continuously fed to the recirculating mixture at rates of about 4.37 and about 113.6 volumes per minute, respectively, and chlorine was added in substantially equimolar proportions based on the allyl chloride employed. A product stream was withdrawn from the circulating mixture at a rate of about 132.5 volumes per minute. In this system the added allyl chloride, together with the minor amount of other organic phase components present, was rapidly dispersed into the form of fine droplets within the circulating reaction mixture under the influence of the centrifugal pump. In fact, all the non-aqueous phase components present in the stream leaving the pump were dispersed into particles varying from 3 to 20 microns in diameter, which degree of dispersion was maintained well beyond the reaction zone. The aqueous reaction mixture had a total residence time in the system (determined by dividing the volume of the system by the rate of product drawoff, per minute) of 2 minutes and a residence time in the reaction zone, per pass (determined by dividing the volume of the reaction zone, 82 volumes, by the circulating rate, per minute) of 3.7 seconds. Upon distilling the dichlorohydrin isomers from the product stream, it was found that 92% of the allyl chloride feed had been converted to dichlorohydrins.

*Example II*

This operation was conducted under the conditions described in Example I, but with the reaction mixture being circulated through the system at a rate of 5300 volumes per minute, thereby reducing the residence time of the mixture in the reaction zone, per pass, to 0.9 second. The other conditions of operation (including the maintenance of the organic phase in the form of droplets varying from 3 to 20 microns in dia.) remained the same. Analysis of the product stream disclosed that approximately 92.3% of the allyl chloride feed was being converted to dichlorohydrins.

*Example III*

In a companion operation, conducted in the same manner as described in Example I, but with the allyl chloride being supplied to the circulating reaction mixture at a point just down stream from the centrifugal pump, the conversion of allyl chloride to dichlorohydrins is observed to drop to approximately 85%. Here the allyl chloride droplets present in the reaction mixture have a diameter somewhat in excess of 100 microns. However, by feeding allyl chloride to the recirculating stream (again down stream from the pump) under pressure through an atomizing jet, the dichlorohydrin yield is again raised to 92%. In the latter case the injected allyl chloride is present in the form of droplets measuring less than 100 microns in size.

*Example IV*

This operation is conducted under the conditions described in Example I, but with the centrifugal pump being replaced by a conventional piston-type pump which does not effect a high degree of dispersion of the organic phase present in the circulating reaction mixture, and with the allyl chloride being added down stream from the pump. In this case it is observed that the yield of dichlorohydrins drops to approximately 75%, based on the amount of allyl chloride employed. This yield is somewhat increased (to about 85%) when the allyl chloride is supplied under pressure to the circulating mixture through an atomizing jet as in Example III. In neither of the operations described herein is the organic phase, other than allyl chloride, present in the form of droplets measuring less than 100 microns in diameter.

The invention claimed is:

1. In a process for producing halohydrins by reacting an olefinic compound the group consisting of olefinic hydrocarbon, olefinic halo-substituted hydrocarbons, olefinic alcohol, olefinic ketones and olefinic aldehydes in the liquid state having at least one olefinic double bond in an aliphatic radical and a solubility in water of less than 1% at 20° C. with a hypohalous acid in an aqueous reaction medium containing a water-immiscible organic phase of by-products of the reaction, the method of reducing the formation of said by-products which comprises dissolving said olefinic compound in an aqueous reaction medium using at least 250 volumes of said medium per volume of said olefinic compound, adding halogen to the solution after solution of said olefinic compound is substantially complete, maintaining the mixture under reaction conditions until the added halogen has reacted while keeping the said organic by-product phase present in the form of particles of less than 100 microns in diameter.

2. A process in accordance with claim 1 wherein allyl chloride is used as the olefinic compound and chlorine as the added halogen whereby dichlorohydrin isomers are produced.

3. A process in accordance with claim 1 wherein a portion of the reacted mixture is separated for recovery of product and the remainder, together with sufficient water to compensate for that removed with the product, is returned to the process along with the said finely dispersed organic phase present therein to serve as the medium for dissolving said olefinic reactant.

4. In a process for producing a dihalohydrin by reacting a mono-olefinic monohalo-substituted aliphatic hydrocarbon with a hypohalous acid in an aqueous reaction medium whereby said dihalohydrin and a water-immiscible liquid phase containing organic by-products are formed, the method of reducing the yield of said by-products, which comprises continuously circulating the aqueous reaction medium at a rate of at least 250 volumes per volume of olefinic halide feed, dissolving said olefinic halo-substituted hydrocarbon in said circulating aqueous medium, introducing halogen into the circulating medium downstream of the point of introduction of said olefinic halo-substituted hydrocarbon, withdrawing a product-containing stream from the mixture after sufficient time for substantial reaction of the olefinic halo-substituted hydrocarbon and said halogen, returning remaining aqueous reaction mixture containing said water-immiscible organic by-product phase to serve as solvent for additional olefinic halo-substituted hydrocarbon while adding sufficient water to compensate for that withdrawn from the circulating stream with the product and maintaining the water-immiscible organic by-product phase present in the reaction mixture finely dispersed in the aqueous medium as particles which are below 100 microns in diameter.

5. In a process for producing dichlorohydrin by reaction of allyl chloride with chlorine in aqueous solution, the steps comprising circulating an aqueous reaction mixture through a conduit system at a rate of at least 250 volumes per volume of allyl chloride feed; continuously adding make-up water to the circulating mixture; continuously dissolving allyl chloride in the circulating mixture and finely dispersing therein, into droplets measuring less than 100 microns in diameter, the water-immiscible organic by-product phase present; continuously adding chlorine to the circulating mixture at a point downstream from the point of allyl chloride introduction at which solution of the allyl chloride is complete; retaining the resulting mixture in the system until reaction between the allyl chloride and chlorine is substantially complete while maintaining the water-immiscible organic by-product phase present in the mixture in the said finely dispersed condition during the reaction interval; continuously withdrawing from the system, as product, a portion of the mixture containing the reacted allyl chloride and chlorine; and recycling the balance of the mixture through the system.

6. The process of claim 5 wherein the aqueous reaction mixture is recycled through the system at a rate of at least 400 volumes for each volume of allyl chloride added.

7. The process of claim 5 wherein the aqueous reaction mixture is recycled through the system at a rate of at least 400 volumes for each volume of allyl chloride added, and wherein the make-up water is added in an amount of from 10 to 50 volumes for each volume of allyl chloride added.

8. The process of claim 5 wherein the reaction mixture is circulated at a rate of at least 250 volumes per minute, the make-up water is added at a rate of from 10 to 50 volumes per minute, the allyl chloride is added at a rate of 1 volume per minute, the chlorine is added in an amount substantially equimolar with respect to the allyl chloride, and the product is continuously withdrawn at a rate so adjusted to maintain a substantially constant volume of liquid in the system.

9. In a process for producing dichlorohydrin isomers wherein allyl chloride and hypochlorous acid are reacted by introducing streams of allyl chloride and chlorine into an aqueous reaction medium wherein there is accumulated in the aqueous reaction mixture a discrete, water-immiscible, liquid organic by-product phase, the steps which comprise continuously recycling the aqueous reaction medium through a closed cyclic conduit system at a rate of at least 250 volumes per volume of allyl chloride fed thereto, continuously introducing into the system substantially equimolar amounts of allyl chloride and chlorine under such conditions that the allyl chloride is dissolved in the aqueous medium before the chlorine is added to the medium, continuously adding make-up water and continuously withdrawing a portion of the entire reaction mixture as product, meanwhile at all times maintaining said liquid organic by-product phase at all times dispersed uniformly throughout the reaction mixture in the form of droplets measuring less than 100 microns in diameter.

References Cited in the file of this patent

UNITED STATES PATENTS

| Number | Name | Date |
|---|---|---|
| 1,394,664 | Brooks | Oct. 25, 1921 |
| 2,007,168 | Kautter | July 9, 1935 |
| 2,060,303 | Groll et al. | Nov. 10, 1936 |
| 2,130,226 | Britton et al. | Sept. 13, 1938 |
| 2,164,240 | Guinot | June 27, 1939 |
| 2,463,850 | Brooks | Mar. 8, 1949 |
| 2,566,355 | Neuhaus | Sept. 4, 1951 |